Patented Nov. 7, 1933

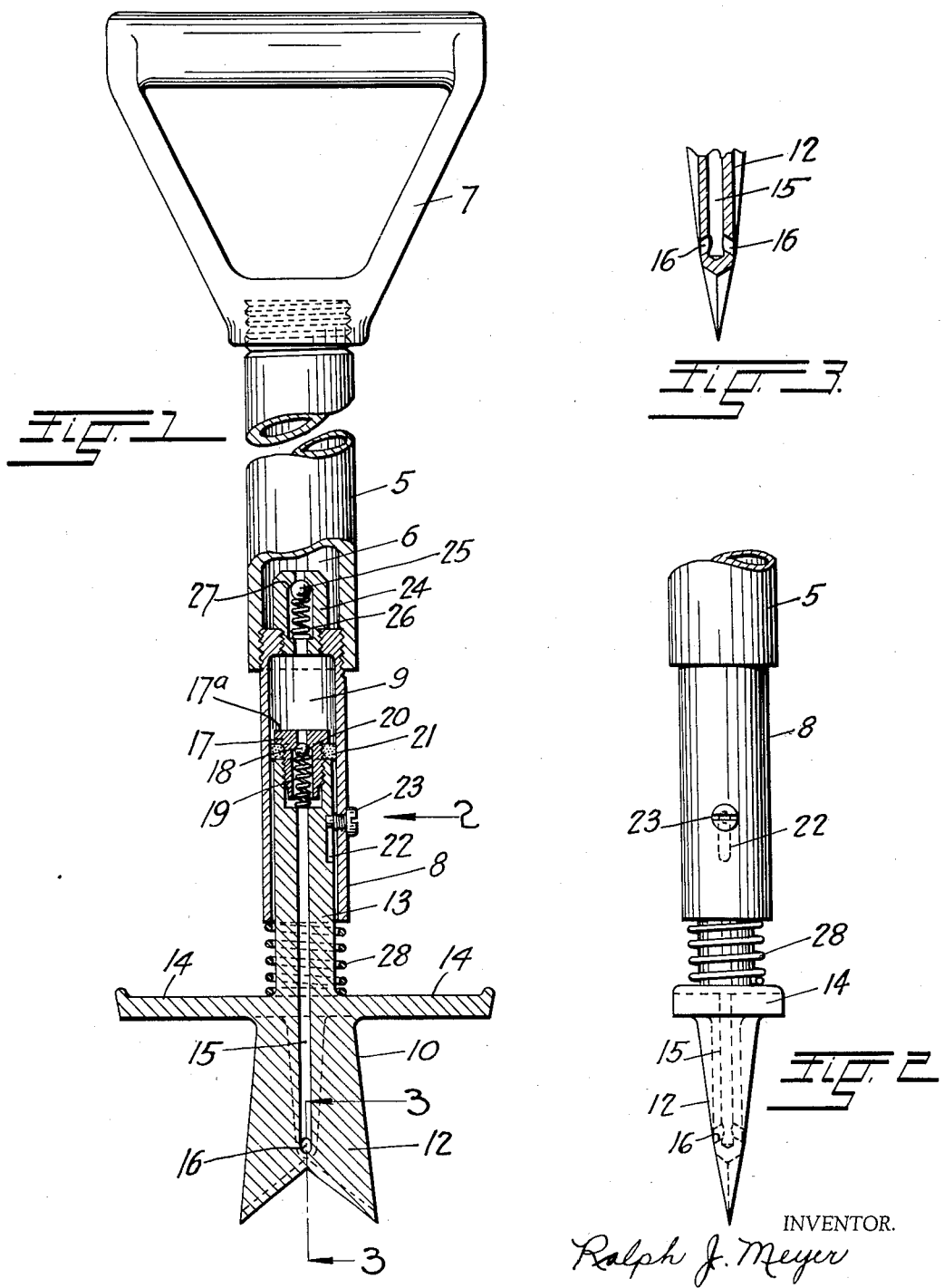

1,934,080

UNITED STATES PATENT OFFICE 1,934,080

WEED EXTERMINATOR

Ralph J. Meyer, Denver, Colo.

Application July 12, 1932. Serial No. 622,031

3 Claims. (Cl. 47—49)

This invention relates to weed-exterminators, and its main object is to provide a tool of simple construction particularly adapted for cutting the roots of weeds beneath the surface of the ground and then ejecting a liquid to the wound, which kills the root.

Another object of the invention is to provide a tool which accomplishes the above result by a simple manipulation of its handle.

A further object resides in the provision of effective and novel means for measuring the quantity of liquid ejected during each operation, and still other objects are to be found in details of construction and a novel arrangement and combination of parts as will fully appear in the course of the following description.

In the accompanying drawing,

Figure 1 represents a sectional elevation of the weed-exterminator,

Figure 2, a side elevation of an end-portion of the same, looking in the direction of the arrow 2 in Figure 1, and Figure 3, a section taken on the line 3—3, Figure 1.

Similar reference characters designate corresponding parts throughout the views.

The tool, as shown, comprises a tubular stock 5 which provides a reservoir 6 for a noxious liquid, which in the operation, kills the roots of the weeds. At the upper end of the stock is a handle 7 and at its opposite end is a cylindrical extension 8 which is screwed into the end-portion of the stock and which in the operation of the tool, provides a measuring-chamber 9.

A cutter 10 has a V-shaped cutting-edge at the end of a blade 12 formed integrally with a stem 13 which projects into the tubular extension 8. The cutter has laterally projected steps 14 which facilitate insertion of the blade into the ground, by foot-pressure. The steps also function as a stop to limit the inward movement of the cutter. The cutter has a central bore 15 which connects at the lower end of the same with apertures 16 in opposite sides of the blade, through which, in the operation, the liquid is ejected. At the upper end of the bore 15 is an enlargement interiorly screw-threaded for the application of a valve-cage 17.

A ball valve 18 in the cage controls the supply of liquid to the measuring chamber 9, and a coiled spring 19 holds the valve to its seat 20. Between a flange 17a on the valve-cage and the end of the cutter-stem, is a washer 21 of resilient material, which fits inside the tubular extension, and functions as a piston. The stem has a longitudinal groove 22 and a screw 23 on the part 8 projects into the groove to limit movement of the part during downward movement of the stock. By lengthening or shortening the groove, the movement of the extension 8 relative to the stem 13 may be regulated to vary the quantity of liquid ejected through the apertures of the cutter blade in each operation.

At the upper end of the chamber 9 provided by the tubular extension, is a second valve-cage 24, containing a ball-valve 25 which controls the supply of liquid from the reservoir 6 to the chamber 9. A coiled spring 26 holds the valve to its seat 27, under normal conditions.

A spring 28 coiled around the stem of the cutter and resting upon the steps 14, provides a yielding support for the stock and its tubular extension.

In the operation of the tool, the cutter is pushed into the ground to cut or sever the root of a weed to be exterminated.

The steps limit the inward movement of the cutter by engagement with the surface of the ground, and when subsequently the stock is subjected to further downward pressure, the spring 28 is compressed and the cylindrical extension 8 is moved lengthwise upon the stem of the cutter. As a result of this movement, the valve 18 is moved away from its seat and liquid contents of the chamber 9 are forced past the valve, into the bore of the cutter to be ejected through the apertures 16. The liquid coming in contact with the root at opposite sides of the cut made by the blade, kills the plant of which the root is a part.

When the stock of the tool is released from pressure, the spring 28 returns the same to its original position, relative to the cutter with the result that, owing to a partial vacuum created in the chamber 9, a new supply of liquid is drawn in from the reservoir 6, past the valve 25.

It will thus be seen that the tool is at all times ready for use to cut the roots of weeds and eject a killing liquid to the cut, by pressure upon the handle of the stock.

What I claim and desire to secure by Letters Patent is:

1. A weed exterminator comprising a cutting-element insertable into the ground by downwardly directed pressure, and having a valve-controlled passage for the injection of a liquid to a root severed in the cutting action, a handle for the exterminator providing a reservoir movable relative to the cutting-element in the same direction and having a valve-controlled outlet for liquid moving to the cutting-element, the two valves cooperating to admit a measured quantity of liquid to the cutting-element, and a spring yieldingly opposing said movement of the reservoir, whereby the cutting-element may be entered into the ground independent of the reservoir, and preliminary to the movement of the reservoir.

2. A weed exterminator comprising a cutting-element insertable into the ground by downwardly directed pressure, and having a valve-controlled passage for the injection of a liquid to a root severed in the cutting action, the element having a step for its movement by foot pressure, a handle for the exterminator providing a reservoir movable relative to the cutting element in the same direction and having a valve-controlled outlet for liquid moving to the cutting-element, the two valves cooperating to admit a measured quantity of liquid to the cutting-element, and a spring yieldingly opposing said movement of the reservoir, whereby the cutting-element may be entered into the ground independent of the reservoir, and preliminary to the movement of the reservoir.

3. A weed exterminator comprising a cutting-element insertable into the ground by downwardly directed pressure, and having a valve-controlled passage for the injection of a liquid to a root severed in the cutting action, the element having a step for its movement by foot pressure and providing a stop to limit insertion of the element into the ground, a handle for the exterminator providing a reservoir movable relative to the cutting element in the same direction and having a valve-controlled outlet for liquid moving to the cutting-element, the two valves cooperating to admit a measured quantity of liquid to the cutting-element, and a spring yieldingly opposing said movement of the reservoir, whereby the cutting-element may be entered into the ground independent of the reservoir, and preliminary to the movement of the reservoir.

RALPH J. MEYER.